Sept. 12, 1944. W. SZUKIEWICZ 2,357,855
METHOD FOR PRODUCING BUTADIENE
Filed Dec. 15, 1941
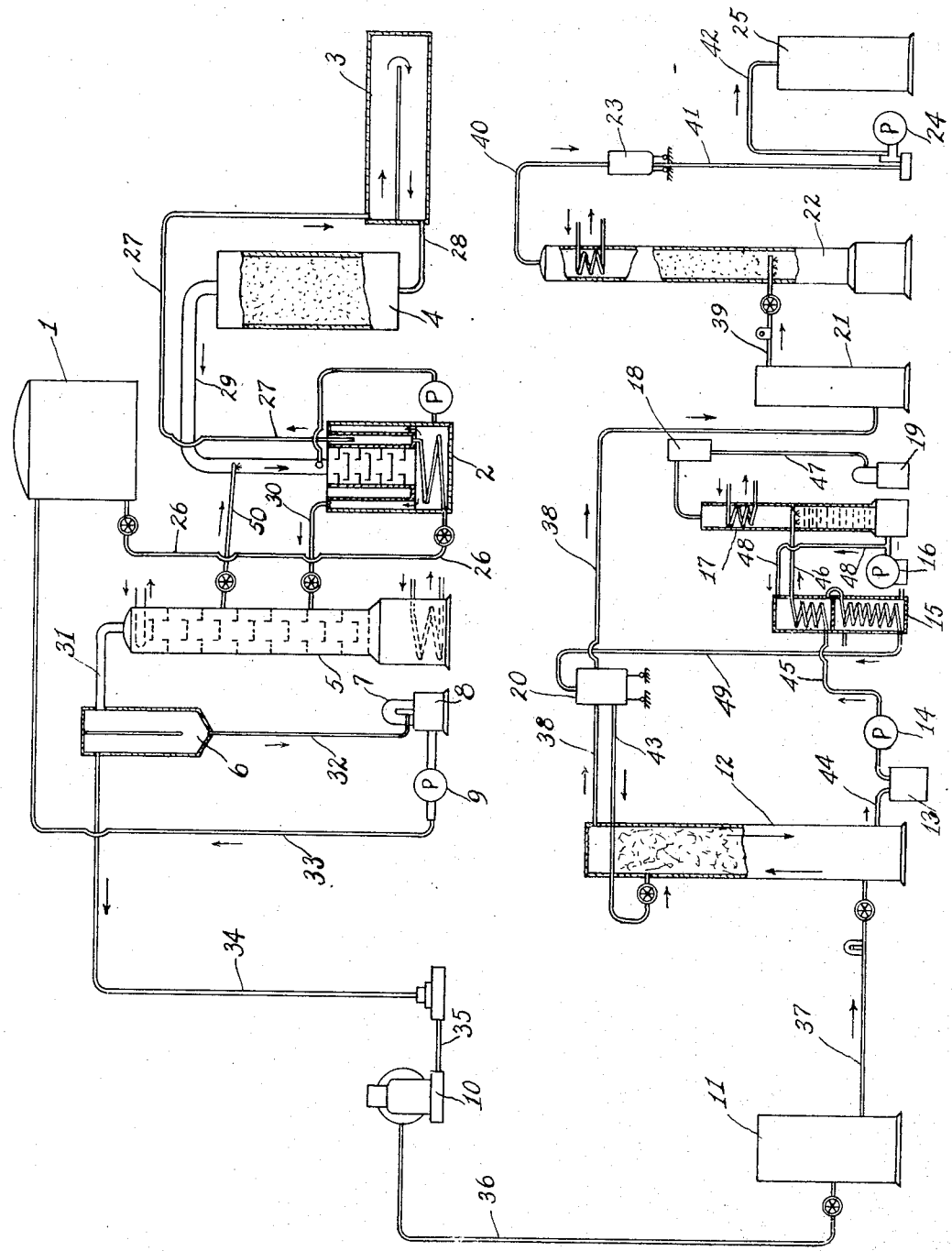
INVENTOR.
Waclaw Szukiewicz Patented Sept. 12, 1944

2,357,855

UNITED STATES PATENT OFFICE 2,357,855

METHOD FOR PRODUCING BUTADIENE

Waclaw Szukiewicz, New York, N. Y., assignor, by mesne assignments, of twenty-four per cent to himself, fifty-five per cent to Tomasz Kuzniarz, as Delegate of the Ministry of Finance of the Republic of Poland, twenty per cent to Dal, Inc., New York, N. Y., a corporation of New York, and one per cent to Boleslaw Przedpelski Application December 15, 1941, Serial No. 422,992

12 Claims. (Cl. 260—681)

My present invention relates to a novel method of producing (1,3) butadiene as one of the principal raw materials for the production of synthetic rubber. The principal sources of butadiene are butane (derived usually from natural gas), coal, petroleum and ethyl alcohol.

A more specific object of my invention is to provide a novel method of producing 1,3 butadiene from ethyl alcohol. The use of ethyl alcohol formed by fermentation is of particular importance in agricultural countries where a surplus of agricultural products suitable for the production of ethyl alcohol can be used in order to obtain the 1,3 butadiene.

It has been known, even prior to 1915, that 1,3 butadiene can be obtained from the decomposition of ethyl alcohol. Later the Russian chemist, Lebediefl, produced butadiene from ethyl alcohol by employing catalysts. Lebedieff used catalysts which could simultaneously exert dehydrating and dehydrogenating actions, for instance uranium oxide. He also used a mixture comprising a catalyst having dehydrating properties and a catalyst having dehydrogenating properties, for instance a mixture composed of aluminium oxides together with manganese salts or manganese oxides.

It is well known that most metal oxides have dehydrating as well as dehydrogenating actions. Sabatier arranged a number of metal oxides in order of their dehydrating and dehydrogenating properties. However, recent investigations have shown that such a rigid classification is not valid, as the behavior of the catalytic oxide is dependent in part on its method of preparation.

It is further known that most organic decompositions do not simply follow the theoretical formula. The reactions are usually more complicated and their course and final results depend not only upon the dehydrating and dehydrogenating properties but also upon the specific properties of the catalysts used.

It has been found that metal oxides when used as catalysts for the decomposition of ethyl alcohol produced a rather poor yield of 1,3 butadiene.

It is further known that the combined or mixed catalysts possess a much stronger activity than the individual or separate activities of the used components would indicate. However, even mixed or combined catalysts do not produce a yield which is commercially and economically satisfactory. In my opinion this can be explained by the fact that as previously mentioned the decomposition of ethyl alcohol and the formation of 1,3 butadiene do not simply follow the formula $2C_2H_5OH \rightarrow 2H_2O + C_4H_6 + H_2$. Quite a number of intermediate reactions take place until the final reaction is reached. This is shown by the formed by-products, for instance butylene. I have found that to secure a satisfactory yield of 1,3 butadiene by decomposition of ethyl alcohol, not only are the dehydrating and dehydrogenating actions of the employed catalyst essential but that other properties are equally necessary. The specific characteristics of such properties and whether a particular catalyst possesses these properties and to what extent can not accurately be predicted at the present state of knowledge of catalysts. On the other hand, as pointed out before, the presence of these properties determines the yield to a large extent.

In carrying out my invention, I use a catalyst giving a yield of 1,3 butadiene by the decomposition of ethyl alcohol which is commercially and economically highly satisfactory, and which may be as much as about 30% to 40% of the decomposed ethyl alcohol. Specifically, I use as the catalyst a composition or mixture of magnesium oxide (MgO) and silicon dioxide ($SiO_2$). Another object of my invention is to use oxides which react with each other.

I have found, further, that the addition of chromic oxide to the magnesium oxide and silicon dioxide increases the yield of 1,3 butadiene by as much as 5% over and above the yield obtained by using catalysts composed of the latter two oxides only. Furthermore, the addition of chromium oxide reduces the formation of some by-products, as for instance ethylene and increases others as for instance butylene.

I have found that temperature influences the yield of 1.3 butadiene and that a temperature of 350° C. to 450° C. results in a very high yield.

In carrying out the present invention I employ means for the heating of ethyl alcohol, means for decomposition of ethyl alcohol, means for separation of the vapors of that portion of alcohol which did not react, means for the separation of water and of high boiling point components and means for the separation of butadiene from the vapors. All this I can accomplish in one single unit and operation, which can result in a 1,3 butadiene fraction containing 60% to 75% butadiene. The entire operation which is fully automatic is operated by a compressor. This compressor aspirates the vapors which are formed and compresses them to about 200 atm. to 300 atm. I use a temperature of about −30° C. to −40° C. for the separation of the butadiene component from those gases and vapors which cannot be liquified under the conditions applied. This low temperature is produced by an expansion of the vapors produced by decomposition of ethyl alcohol at a suitable place, after those vapors have been previously compressed by the compressor.

Another object of my invention is an improved and simplified washing out of the impurities of the 1,3 butadiene as for instance ether, acetaldehyde and others. I accomplish this by washing 1,3 butadiene while in liquid form with a solution of ordinary salt or sugar. I have found such simple washing simplifies greatly the technical production of 1,3 butadiene and reduces the elements and dimensions of the apparatus required for the formation of 1,3 butadiene to a very large extent.

The invention will be described with reference to the accompanying drawing in which 1 is a storage container for ethyl alcohol. From this container the alcohol passes through a pipe 26 into a heat exchanger 2, where it is transformed into vapor. Heat exchanger 2 serves to exchange the heat between the vapors which are formed by the decomposition of the ethyl alcohol and the ethyl alcohol freshly admitted from container 1 through pipe 26. Furthermore, heat exchanger 2 reduces the temperature of the vapor which comes from a catalytic column hereinafter described by means of the liquid which is discharged into the heat exchanger from a distillation column. Finally, the heat exchanger purifies the vapor by separating and retaining any solids for instance metal oxide powder.

From heat exchanger 2, vaporized ethyl alcohol is passed into overheater 3 through pipe 27. In this overheater the alcohol vapors are heated to a temperature of 350° C. to 450° C. then they are discharged into a catalytic column 4 through pipe 28. The vapors formed by the catalytic decomposition of ethyl alcohol are passed again into heat exchanger 2 through pipe 29. Then they are then discharged into distillation column 5 through pipe 30. In column 5 water formed by the decomposition is separated out. Then the vapors are passed into cooler 6 through pipe 31. Part of the liquid in column 5 is withdrawn from this column and discharged into pipe 29 through a pipe 50 in order to cool the vapors passing through pipe 29. In cooler 6 the ethyl alcohol which has not reacted is separated and discharged through pipe 32 into sight device 7 and a container 8. Pump 9 aspirates this ethyl alcohol component from container 8 and pumps it back into storage container 1 through pipe 33.

The gases such as butadiene, butylene, ethylene and others which were not condensed in column 5 and cooler 6 are aspirated by compressor 10 through pipes 34 and 35. Compressor 10 compresses the vapors to about 200 atm. to 300 atm. at a temperature of about —30 C. to —40° C. As a result butadiene and butylene are liquefied and form the so-called butadiene fraction. The elements 1–10 of the apparatus form a unit which is under normal pressure or somewhat reduced pressure and forced by compressor 10. The liquid butadiene fraction which contains about 60% to 75% 1,3 butadiene is stored in a container 11 into which it is passed through a pipe 36.

The butadiene fraction is discharged from container 11 through a pipe 37 into tower 12. In this tower various by-products, as for instance traces of unreacted ethyl alcohol, acetaldehyde, ether and the like, are removed by washing with a saturated solution of ordinary salt or sugar. The washing liquid is passed counter-current to the 1,3 butadiene fraction. The butadiene fraction is washed while in the liquid phase. After the washing, the butadiene fraction which accumulates in the upper part of tower 12, is discharged from this tower through a pipe 38 into an intermediate container 21 and from there through a pipe 39 into a rectifying column 22, in which it expands and is vaporized again. A compressor 24 aspirates the 1,3 butadiene vapors from the upper part of the rectifying column 22 through a pipe 40 into a container 23 where the vapors are dried. From this container the vapors are aspirated through pipe 41 into compressor 24. Here the vapors are condensed and the 1,3 butadiene after being liquefied is discharged into container 25, through pipe 42.

The liquid used for washing the butadiene fraction flows from a container 20 through a pipe 43 into the upper part of tower 12. It is discharged from the lower part of the tower through pipe 44 into a container 13. A pump 14 aspirates the washing liquid from container 13 and pumps it through a pipe 45, a heat exchanger 15 and a pipe 46 into the distillation column 17. In this column ethyl alcohol, aldehyde and ether and the like are separated by distillation. Then they pass through a cooler 18 into a container 19 into which they are discharged by a pipe 47. From this container 19 they can be led back into storage container 1 for further use. However, it is also possible to use them for other purposes. The washing liquid, after separation of the absorbed substances, is pumped by a pump 16 into heat exchanger 15 through pipe 48 and from there into container 20 through pipe 49. In this container 20 the recovered washing liquid can be used again for washing.

Although the heretofore described method is the most preferable the system of operation may vary considerably as there are characteristics in my method and apparatus which make my invention one of broad application, and it is to be understood that modification and change do not depart from the scope of the invention and of the claims covering the invention.

Having described my invention, what I claim and desire to secure by Letters Patent is as follows:

1. A process for producing 1,3 butadiene including the step of passing ethanol over a catalyst comprising magnesium oxide and silica at an elevated temperature.

2. A process for the direct conversion of ethanol to butadiene including the step of passing the ethanol over a mixed catalyst comprising magnesium oxide and silica at an elevated temperature.

3. A process for the direct conversion of ethanol to butadiene including the step of passing ethanol vapor over a catalyst comprising magnesium oxide and silica at a temperature of 350° C. to 450° C.

4. A process for the direct conversion of ethanol to butadiene including the steps of superheating ethanol vapors to 350° C. to 450° C., passing the superheated vapors over a mixed catalyst comprising magnesium oxide and silica, and recovering butadiene from the gases issuing from the reaction mixture.

5. A process for the direct conversion of ethanol to butadiene including the steps of pre-heating ethanol vapors to 350° C. to 450° C., passing the heated ethanol vapors over a catalyst comprising magnesium oxide and silica to convert a portion of the ethanol to butadiene and other reaction products, cooling the gases leaving the catalyst to remove unreacted ethanol, water and high-boiling reaction products, subjecting the gases to a pressure of 200 atm. to 300 atm. and a temperature of −30° C. to −40° C. to liquefy butadiene and other reaction products having similar boiling points, washing the liquefied mixture to remove impurities, fractionally distilling the liquefied mixture and recovering a butadiene-rich fraction from the distillate.

6. A process for the direct conversion of ethanol to butadiene including the step of passing the ethanol over a mixed catalyst comprising magnesium oxide, silica and chromium oxide at an elevated temperature.

7. A process for the direct conversion of ethanol to butadiene including the step of passing the ethanol over a mixed catalyst comprising magnesium oxide, silica and chromium oxide at a temperature of 350° C. to 450° C.

8. A process for the direct conversion of ethanol to butadiene including the step of passing heated ethanol vapors over a catalyst formed by the interaction of magnesium oxide and silica.

9. A process for the direct conversion of ethanol to butadiene including the steps of pre-heating ethanol to a temperature of 350° C. to 450° C. and passing heated ethanol over a catalyst prepared by the interaction of magnesium oxide and silica.

10. A process for the direct conversion of ethanol to butadiene including the steps of pre-heating ethanol to a temperature of 350° C. to 450° C. and passing the heated ethanol over a catalyst prepared by interacting magnesium oxide and silica and subsequently adding chromium oxide.

11. A process for the direct conversion of ethanol to butadiene including the steps of pre-heating ethanol vapors to 350° C. to 450° C., passing the heated ethanol vapors over a catalyst comprising magnesium oxide and silica to convert a portion of the ethanol to butadiene and other reaction products, cooling the gases leaving the catalyst to remove unreacted ethanol, water and high-boiling reaction products, subjecting the gases to a pressure of 200 atm. to 300 atm. and a temperature of −30° C. to −40° C. to liquefy butadiene and other reaction products having similar boiling points, washing the liquefied mixture with saturated salt solution to remove impurities, fractionally distilling the liquified mixture and recovering a butadiene-rich fraction from the distillate.

12. A process for the direct conversion of ethanol to butadiene comprising continuously pre-heating ethanol vapors to 350° C. to 450° C., continuously passing the heated ethanol vapors over a catalyst comprising magnesium oxide and silica to convert a portion of the ethanol to butadiene and other reaction products, continuously cooling the gases leaving the catalyst to remove unreacted ethanol, water and high-boiling reaction products, continuously subjecting the gases to a pressure of 200 atm. to 300 atm. and a temperature of −30° C. to −40° C. to liquefy butadiene and other reaction products having similar boiling points and recovering butadiene from the liquefied mixture by fractional distillation; the vapors passing from the pre-heating step to the liquefying step in a generally continuous stream under the influence of suction means used in the liquefying step.

WACLAW SZUKIEWICZ.